(12) United States Patent
Hirota et al.

(10) Patent No.: US 8,067,477 B2
(45) Date of Patent: Nov. 29, 2011

(54) RESIN COMPOSITION FOR ELECTROPHOTOGRAPHIC TONERS AND ELECTROPHOTOGRAPHIC TONERS

(75) Inventors: Yasunobu Hirota, Ichihara (JP); Nobuyoshi Shirai, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/864,141

(22) PCT Filed: Jan. 21, 2009

(86) PCT No.: PCT/JP2009/050818
§ 371 (c)(1),
(2), (4) Date: Jul. 22, 2010

(87) PCT Pub. No.: WO2009/093592
PCT Pub. Date: Jul. 30, 2009

(65) Prior Publication Data
US 2010/0297547 A1 Nov. 25, 2010

(30) Foreign Application Priority Data

Jan. 24, 2008 (JP) ................................. 2008-013629

(51) Int. Cl.
*C08L 67/00* (2006.01)
(52) U.S. Cl. .................. 521/138; 430/109.1; 430/109.4; 525/418
(58) Field of Classification Search ............... 430/109.1, 430/109.4; 521/138; 525/418
See application file for complete search history.

(56) References Cited

U.S. PATENT DOCUMENTS
2003/0212296 A1   11/2003   Frings et al.

FOREIGN PATENT DOCUMENTS

| | | |
|---|---|---|
| JP | 2001-242661 A | 9/2001 |
| JP | 2003-261659 A | 9/2003 |
| JP | 2005-049440 A | 2/2005 |
| JP | 2005-077602 A | 3/2005 |
| JP | 2005-316378 A | 11/2005 |
| JP | 2006-188683 A | 7/2006 |
| JP | 2008-015037 A | 1/2008 |
| WO | WO-2008/059645 A1 | 5/2008 |
| WO | WO-2008/059646 A1 | 5/2008 |

OTHER PUBLICATIONS

International Search Report dated Mar. 17, 2009, issued on PCT/JP2009/050818.

*Primary Examiner* — Peter Vajda
(74) *Attorney, Agent, or Firm* — Edwards Angell Palmer & Dodge LLP

(57) ABSTRACT

An object of the present invention is to provide the resin composition for electro-photographic toner, which the electro-photographic toner to be obtained by it is superior to low temperature fixing properties and a hot offset resistance, and the electro-photographic toner thereof. To be achieved this purpose, multi-branched state polyester structure having a structure representing the following structural formula (1) as a repeating unit, is made into a main skeleton (In the formula, R expresses an aliphatic hydrocarbon group, and n shows the number of repeating units of a branched structure and is an average of 1-5.) *a is a node of the carbon atom of a carbonyl group, *b is a node of an oxygen atom, and *b is bonded to *a in the other repeating unit of the structural formula (1)). In addition, polyester resin (A) having a ratio of 25 to 95% of the weight for alkyl group of the number of carbon atoms 20-80 or alkenyl group of the number of carbon atoms 20-80 to the molecular terminal and aliphatic series crystalline polyester resin (B) is contained. The electro-photographic toner containing the resin composition for electro-photographic toner and this composition is provided.

14 Claims, No Drawings

RESIN COMPOSITION FOR ELECTROPHOTOGRAPHIC TONERS AND ELECTROPHOTOGRAPHIC TONERS

TECHNICAL FIELD

The present invention relates to a resin composition for electro-photographic toner capable to be obtained electro-photographic toner that is excellent in low temperature fixing properties and in hot offset resistances and an electro-photographic toner that is excellent in low temperature fixing properties and hot offset.

BACKGROUND OF THE INVENTION

In recent years, to archive low-power consumption of a laser printer or a copy machine, improvement in performance for fixing at low temperature (low temperature fixing properties) is demanded for toner for electro photography.

In order to raise low temperature fixing properties, a polyester-based resin is generally used as binder resin in toner, and further improvement in low temperature fixing properties is designed by reducing the softening point of the resin.

However, when improvement in the low temperature fixing properties of electro-photographic toner is designed by lowering the softening point of binder resin, a hot offset resistance will decline significantly.

Therefore, the method to include a wax in electro-photographic toner is generally used.

However, generally, the compatibility between a wax and polyester-based binder resin is extremely poor, so a wax cannot be included in binder resin, for example, only about 2 to 3% of the weight.

Even if it can include a wax about 2 to 3% of the weight in binder resin, the wax dispersion in toner will not be uniform, and the hot offset will be occurred.

Thus, to obtain the electro-photographic toner that was superior in low temperature fixing properties and in a hot offset resistance was difficult.

As a method to improve the dispersibility of a wax, it is attempted to raise the compatibility between a wax and polyester-based binder resin; and for example, manufacturing electro-photographic toner by using the composition containing binder resin and a wax with a compatibilizer that further makes compatible for these is known.

As such a composition, in the concrete, for example, a composition, which contains binder resin of polyester-based resin, a wax, and the compatibilizer obtained by reacting maleic anhydride denaturation polyolefin with polyester resin, is disclosed (for example, see patent documents 1.).

This compatibilizer has a formation adding polyolefin that is superior in compatibility with a wax to a similar-based polyester resin of a binder resin.

The compatibility between the wax and the polyester-based resin as binder resin improves by using this compatibilizer, and the wax can be used about 5% of the weight to the weight of binder resin, which is much more than former.

However, about 5% of the weight is insufficient for the content of a wax to the weight of binder resin in order to obtain the toner that is superior in a hot offset resistance, and it may be necessary to be about 10% of the weight.

In the patent documents 1, the polyester resin used for preparing the compatibilizer is about 0.02-1 mmol/g in hydroxyl group (about 1-70 mg KOH/g as in hydroxyl value,) and it is a polyester resin generally used in the field of the electro-photographic toner. However, in such polyester resin, little quantity of the hydroxyl group exists for binding of polyolefin.

For this reason, polyolefin for sufficient quantity cannot be applied, which the content of a wax to be used about 10% of the weight to the weight of binder resin.

Even if it tried to increase the amount of the compatibilizer used and to increase in the quantity of the wax which can be dispersed in binder resin, since the molecular weight of the polyolefin chain added to the compatibilizer is as large as 1000-20000, the compatibility between the compatibilizer and the binder resin does not be satisfactory. Thus, to mix with binder resin in large quantities is difficult.

Patent documents 1: Japanese Unexamined Patent Application, First Publication No 2005-316378

DISCLOSURE OF THE INVENTION

Problems to be Solved

The problem to be solved by the present invention is to provide a resin composition for electro-photographic toner that provides electro-photographic toner which has excellent low temperature fixing properties and a hot offset resistance, and electro-photographic toner which has excellent low temperature fixing properties and hot offset resistance.

Means for Solving the Problem

As a result of diligent researches, the inventors of the present invention found the following.

1) In the polyester resin which having a main skeleton as a repeating unit, which structure is shown in the following structural formula (1)

[Formula 1]

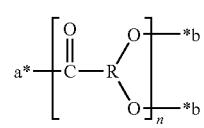

(R shows an aliphatic hydrocarbon group in the formula, and n represents the number of repeating units of the branched structure and is an average of 1-5. *a is a node of the carbon atom of a carbonyl group, and *b is a node of an oxygen atom, and *b is bonded to *a in the other repeating unit of the structural formula (1)) can be to have a lot of alkyl groups or alkenyl groups in the molecular terminal as compared with the patent documents 1. Also in this alkyl group or an alkenyl group, the number of carbon atoms serves as polyester resin having excellent properties of wax, when the alkyl group or an alkenyl group in which a number of carbon atoms is within the range of 20-80, at a weight ratio of 25 to 95% on the basis of the weight of this polyester resin.

2) When mixing with the other polyester resin, this polyester resin can be dispersed satisfactory, even if it makes it mix with 50% of the weight in large quantities to the total quantity of this polyester resin and the other polyester resin.

3) This polyester resin has excellent compatibility with a wax and performs a function as a compatibilizer; also, as above-mentioned, this polyester resin can be added for a quantity of 50% of the weight to the total quantity with other polyester resin, which is very enough quantity to be satisfied with the nature of hot offset; and thus, it can exhibit a function as a wax.

Therefore, without adding other waxes again into a mixture of this polyester resin with the other polyester resin, a toner for electro photography, which is superior in low temperature fixing properties and in nature of hot offset can be obtained.

The present invention is completed based on the above-mentioned knowledge.

That is, the present invention provides the resin composition for electro-photographic toner containing a resin composition for electro-photographic toner comprising: a polyester resin (A) and an aliphatic crystalline polyester resin (B), wherein the polyester resin (A) has an alkyl group in which a number of carbon atoms is within the range of from 20 to 80 or an alkenyl group in which a number of carbon atoms is within the range of from 20 to 80 to a molecular terminal, at a weight ratio of 25 to 95% by weight of the resin, and has a chemical structure represented by the following multi-branched polyester structural formula (1):

[Formula 2]

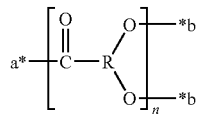

(1)

(wherein R represents an aliphatic hydrocarbon group, and n represents a number of the repeating units of the branched structure and is an average of 1-5. *a is a node of the carbon atom of a carbonyl group, *b is a node of an oxygen atom and is bonded to *a in the other repeating unit).

Also, the present invention provides an electro-photographic toner that contains the resin composition for toner for electro photography.

Effects of the Invention

According to the present invention, a resin composition, which the electro-photographic toner being superior in low temperature fixing properties and in a hot offset resistance can be obtained, and electro-photographic toner, which is superior in low temperature fixing properties and a hot offset resistance, can be provided.

BEST MODE FOR CARRYING THE INVENTION

Polyester resin (A) used by the present invention has a main skeleton of multi-branched polyester structure having the structure shown by the following structural formula (1) as a repeating unit.

Then, in the molecular terminal, it has at a ratio which will be within the range of 25 to 95% of the weight for an alkyl group having the number of carbon atoms within the range of 20-80 or an alkenyl group having the number carbon atoms within the range of 20-80, as the number of carbon atoms.

[Formula 3]

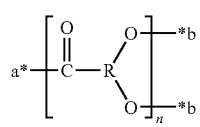

(1)

(In the formula, R shows an aliphatic hydrocarbon group; and n expresses the number of repeating units of branched structure and is an average of 1-5. *a is a node of the carbon atom of a carbonyl group, *b is a node of an oxygen atom, and *b is bonded to *a in the other repeating unit of other structural formulas (1)).

As mentioned above, "n" in a structural formula (1) shows the number of repeating units of branched structure.

The number of structures bundled with "n" increases as this "n" increases.

For example, when "n" is 1 in the above-mentioned structural formula (1), the number of the structures surrounded by "n" is one.

When "n" is 2, the number of the structures surrounded by "n" becomes three.

Thus, polyester resin, which has structure such as a structural formula (1), the number of ends also increases as "n" increases.

Then, since it is easy to make this end having functional groups, such as a hydroxyl group, the functional group number of a hydroxyl group, etc., can be increased by raising the number of ends.

By reacting a functional group that reacts with this functional group (for example, a carboxyl group, etc.,) to a compound which has an alkyl group with the range of 20-80 carbon atoms or an alkenyl group with the range of 20-80 carbon atoms, it can be made as polyester resin (A) used by the invention in this application, which includes this alkyl group and alkenyl group in large quantities as with the range of 25 to 95% of the weight.

When "n" is 2 in the structural formula (1), for example, it becomes the following structures.

[Formula 4]

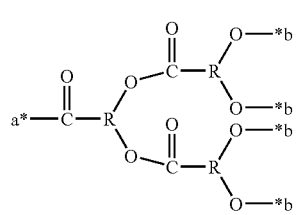

(2)

Also, when "n" is 3 in the structural formula (1), for example, it becomes the following structures.

[Formula 5]

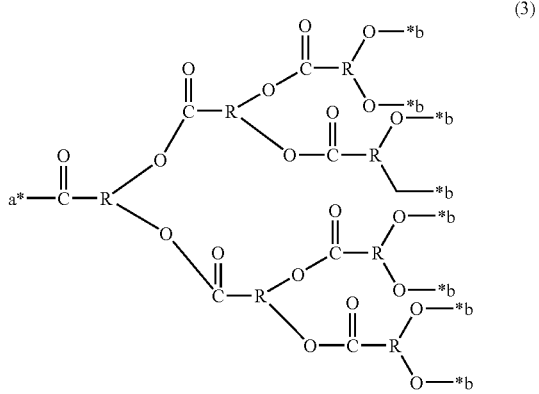

Thus, the end increases in number as the number of "n" of a structural formula (1) increases.

In addition, in the present invention, although "n" is the number of repeating units of branched structure, it can also express as a generation number.

As for "n" in a structural formula (1), the range of 2-4.5 are preferred, and the range of 2.5-4 are more preferred because of a polyester resin which has an alkyl group in the range of 20-80 carbon atoms or an alkenyl group with 20-80 carbon atoms in the range of 25-95% of the weight to be more easily obtained.

"R" in a structural formula (1) is an aliphatic hydrocarbon group.

This hydrocarbon group is an acid or an alcohol residue of a raw material to manufacture multi-branched state polyester structure, which has the structure shown in a structural formula (1) as a repeating unit.

As "R", an aliphatic hydrocarbon group with range of 2-7 carbon atoms is preferred, and an aliphatic hydrocarbon group with range of 3-6 carbon atoms is more preferred.

The numbers of carbon atoms of the alkyl group and alkenyl group, which the polyester resin (A) used in the present invention has, need to be the range of 20-80.

When the number of carbon atoms is less than 20 is not desirable because obtained Polyester resin (A) becomes difficult to show a function as a wax and declines a mold-release characteristic.

Also, it is not preferable because a glass transition point or a melting point of obtained electro-photographic toner declines, a hot offset resistance and blocking resistance (a property that a toner particle does not condense during preservation within a copy machine) declines significantly.

Further, it is not preferable because compatibility with a general-purpose wax which may be used as required at the time of preparation of electro-photographic toner declines, and desired mold-release characteristic not being acquired.

When the number of carbon atoms is more than 80, the melting point of polyester resin (A) will be too high.

As a result, it is not preferable because the electro-photographic toner has insufficient low temperature fixing properties.

Also, the compatibility of obtained polyester resin (A) and polyester resin (B) that functions as binder resin declines, and it makes phase separation as a result.

For this reason, it is not preferable because managing both low temperature fixing properties and the hot offset resistance for electro-photographic toner is difficult, and it is not desirable.

As an alkyl group and an alkenyl group, an alkyl group that the number of carbon atoms is in the range of 22-78 or an alkenyl group that the number of carbon atoms is in the range of 22-78 are desirable because it becomes a composition that can be obtained electro-photographic toner being superior in blocking resistance in addition to low temperature fixing properties and a hot offset resistance; and an alkyl group having the number of carbon atoms in the range of 22-74 or an alkenyl group having number of carbon atoms in the range of 22-74 are the more preferred.

As the quantity of an alkyl group or an alkenyl group, which polyester resin (A) used by the present invention has, a ratio being in the range of 25-95% of the weight is required.

When the quantity of an alkyl group or an alkenyl group is less than 25% of the weight, since obtained polyester resin (A) becomes difficult to show the function as a wax, a mold-release characteristic declines, and it is not desirable.

Also, because the glass transition point or melting point of obtained electro-photographic toner declines, and a hot offset resistance and blocking resistance (character which a toner particle does not condense during preservation within a copy machine) declines remarkably, and it is not preferable.

Further, compatibility with a general-purpose wax which may be used as required at the time of preparation of electro-photographic toner declines, a mold-release characteristic is not acquired and is also not desirable.

When the quantity of an alkyl group or an alkenyl group is more than 95% of the weight, a melting point of polyester resin (A) becomes too high.

As the result, it will be electro-photographic toner with insufficient low temperature fixing properties and is not desirable.

Moreover, compatibility of obtained polyester resin (A) for polyester resin (B) that functions as binder resin declines and makes phase separation.

For this reason, it is not desirable managing both the low temperature fixing properties and the hot offset resistance for electro-photographic toner is.

As the polyester resin (A) used in the present invention, a polyester resin in which quantity of an alkyl group or an alkenyl group is in range of 50 to 90% of the weight is desirable; because it becomes a composition to be obtained electro-photographic toner that is superior in blocking resistance in addition to low temperature fixing properties and a hot offset resistance; and in range of 65 to 85% of the weight is more preferred.

Polyester resin (A) used in the present invention is obtained by reacting, for example, a compound (a1) which contains the above-mentioned alkyl group of an alkenyl group and has functional groups (for example, carboxyl group, etc.) with polyester resin (a2) which has as a main skeleton by multi-branched state polyester structure having the structure shown by a structural formula (1) as a repeating unit, and contains many functional groups which are functional groups (for example, hydroxyl group, etc.) reacting with that of the compound (a1).

The compound (a1) used for preparation of polyester resin (A) used in the present invention is a compound which has a monovalent functional group having an alkyl group of the number of carbon atoms in range of 20-80 or an alkenyl group having the number of carbon atoms in range of 20-80, etc., can be listed.

As a compound (a1), for example, monocarboxylic acid having an alkyl group in which the number of carbon atoms is in range of 20-80, monocarboxylic acid having an alkenyl group in which the number of carbon atoms is in range of 20-80, monoalcohol having an alkyl group in which the number of carbon atoms is in range of 20-80, monoalcohol having an alkenyl group in which the number of carbon atoms is in range of 20-80, monoamine having an alkyl group in which the number of carbon atoms of is in range of 20-80, monoamine having an alkenyl group in which the number of carbon atoms is in range of 20-80, etc., are listed.

In addition, a melting point of polyester resin (A) has a range by small to large in weight-average molecular weight of polyester resin (A). However, in general, it can be changed in combination of the number of carbon atoms of an alkyl group or an alkenyl group for the compound (a1) with the amount used (molar quantity) for it.

For example, when the number of carbon atoms of an alkyl group of a compound (a1) is fixed to 50: if the amount used (molar quantity) is 11 mol %, content of this alkyl group in polyester resin (A) will be 44% of the weight, and a melting point will be 80° C. (weight-average molecular weight 11800); and if the amount used (molar quantity) is 59 mol %, content of this alkyl group in polyester resin (A) will be 92% of the weight, and a melting point will be 91° C. (weight-average molecular weight 15900).

Also, when the amount (molar quantity) of alkyl group used of a compound (a1) is fixed to 11 mol %: if the number of carbon atoms is 22, content of this alkyl group in polyester resin (A) will be 27% of the weight, and a melting point will be 46° C. (weight-average molecular weight 4500); and if the number of carbon atoms is 78, the content of this alkyl group in polyester resin (A) will be 55% of the weight, and a melting point will be 137° C. (weight average molecular weight 20900).

As the amount of compound (a1) used at in case of preparing polyester resin (A), 10-60 mol % to total molar quantity of a raw material used for preparation of polyester resin (a2) and the above-mentioned compound (a1) is preferable because it is easy to prepare a polyester resin containing in range of 25-95% of the weight for an alkyl group having the number of carbon atoms in range of 20-80 and/or an alkenyl group having the number of carbon atoms in range of 20-80; 15-58 mol % is more preferred; and 20-56 mol % is still more preferred.

As the monocarboxylic acid having an alkyl group in which the above-mentioned number of carbon atoms is in the range of 20-80, for example, arachin acid (20 carbon atoms), behenic acid (22 carbon atoms), cerotic acid (26 carbon atoms), montanic acid (28 carbon atoms), melissic acid (30 carbon atoms), tetracontanoic acid (40 carbon atoms), pentacontanoic acid (50 carbon atoms), hexacontanoic acid (60 carbon atoms), octaheptacontanoic acid (78 carbon atoms), or the like, can be listed.

As the monocarboxylic acid having above-mentioned alkenyl group in which the number of carbon atoms is in the range of 20-80, for example, gadoleic acid (20 carbon atoms), erucic acid (22 carbon atoms), nervonic acid (24 carbon atoms), a triacontene acid (30 carbon atoms), tetracontene acid (40 carbon atoms), pentacontene acid (50 carbon atoms), hexacontene acid (60 carbon atoms), octaheptacontene acid (78 carbon atoms), etc., can be listed.

As the monoalcohol which has the above-mentioned alkyl group having the carbon atoms in the range of 20-80, for example, an eicosanol (20 carbon atoms), triacontanol (30 carbon atoms), tetracontanol (40 carbon atoms), pentacontanol (50 carbon atoms), hexacontanol (60 carbon atoms), octaheptacontanol (78 carbon atoms), etc., are able to be mentioned.

As the monoalcohol which has the above-mentioned alkenyl group having carbon atoms in the range of the 20-80, for example, a cis-13-docosenol (22 carbon atoms), a triacontenol (30 carbon atoms), a tetracontenol (40 carbon atoms), a pentacontenol (50 carbon atoms), a hexacontenol (60 carbon atoms), an octahepta-contenol (78 carbon atoms), etc., can be listed.

As the monoamine which has above-mentioned alkyl group having carbon atoms in the range of 20-80, for example, eicosylamine (20 carbon atoms), triacontylamine (30 carbon atoms), tetracontylamine (40 carbon atoms), pentacontylamine (50 carbon atoms), hexacontylamine (60 carbon atoms), octahepta-contyl amine (78 carbon atoms), etc., are enumerated.

As the monoamine which has above-mentioned alkenyl group having carbon atoms in the range of 20-80, for example, eicosenylamine (20 carbon atoms), triacontenylamine (30 carbon atoms), tetracontenylamine (40 carbon atoms), pentacontenylamine (50 carbon atoms), hexacontenylamine (60 carbon atoms), octahepta-contenylamine (78 carbon atoms), etc., can be listed.

As the compounds (a1) used by the present invention, monocarboxylic acid and monoalcohol are preferred, and monocarboxylic acid is more preferred.

As the polyester resin (a2) used for preparation of polyester resin (A) used by the present invention, multi-branched state polyester structure, which has the structure shown in a structural formula (1) as a repeating unit, is a main skeleton, and the polyester resin (a2) which contains a lot of functional groups being reacted with functional groups having in the compound (a1), etc., are listed.

As the functional group which reacts with a functional group having in a compound (a1), for example, a hydroxyl group, an amino group, a carboxyl group, an isocyanate group, etc., can be enumulated.

For example, if a compound (a1) is monocarboxylic acid,) as polyester resin (a2), for example, the polyester resin having a hydroxyl group, the polyester resin having an amino group, etc., are mentioned.

In case this compound (a1) is monoalcohol or monoamine, as polyester resin (a2), for example, the polyester resin which has a carboxyl group, the polyester resin which has an isocyanate group, etc., are listed.

As the concentration of the functional group in polyester resin (a2), since it is easy to obtain the polyester resin which includes in the range of 25 to 95% for the weight of the above-mentioned the alkyl group or the alkenyl group, in the range of 1.5-15 mmol/g is preferred, in the range of 3.5-12 mmol/g is more preferred, and in the range of 5.0-12 mmol/g is further more preferred.

In the polyester resin (a2) used in the present invention, because introducing the alkyl group into the resin (A) is easy and the reactivity with this compound (a1) are excellent, etc., a polyester resin which has a hydroxyl group and the polyester resin which has a carboxyl group in a main chain skeleton are preferred, and the polyester resin which has a hydroxyl group is more preferred.

As a hydroxyl value, the range of 100-750 mg KOH/g is preferred, the range of 200-700 mg KOH/g is more preferred, and the range of 300-680 mg KOH/g is still more preferred.

By the above-mentioned matter, as the polyester resin (A) used by the present invention, a polyester resin which used the monocarboxylic acid which has the alkyl group in which the number of carbon atoms is in the range of 20-80 or an alkenyl group in which the number of carbon atoms is in the range of 20-80, and the polyester resin (A1) which has a main skeleton of multi-branched state polyester structure having the structure expressed in structural formula (1) as a repeating unit and has a hydroxyl group which a hydroxyl value may serve as in the range of 100-750 mg KOH/g, and obtained the quantity of the monocarboxylic acid will be in the range of 10-60 mol % to the total molar quantity of the raw material used for preparation of polyester resin (A1) and the monocarboxylic acid.

The polyester resin (a2) used by the present invention, for example, as mentioned above, multi-branched state polyester structure having the structure shown by a structural formula (1) as a repeating unit is as a main skeleton, and a lot of functional groups, such as a hydroxyl group, are included.

As the polyester resin which has such a structure, for example, dendrimer type polyester resin, which is a polymer having the structure branched high order regularly, etc., are listed.

The polyester resin has the multi-branched state structure having the structure indicated in the structural, formula (1) as a repeating unit (for example, dendrimer type polyester resin.) It is formed by the layer structure described as a generation as polymers of nano-meter size. The molecular weight distribution of it is narrow, and many reaction groups exist at the end.

This feature is used in the present invention; and the functional group that reacts with the functional group of the compound (a1) is used, for example, in the range of 1.5-15 mmol/g. As compared with the polyester resin formerly used for electro-photographic toner, the polyester resin having a lot of functional groups is used. Accordingly, the polyester resin (A) can be made to have the range of 25-95 weight sections of the alkyl group or an alkenyl group. As a result, obtained polyester resin (A) shows the effect as a wax. Moreover, because it is superior in compatibility with the other polyester resin (B) used as binder resin, polyester resin (B) also becomes excellent in the dispersibility of polyester resin (A). In the result, the electro-photographic toner which is superior in low temperature fixing properties and a hot offset resistance can be obtained.

Moreover, the above-mentioned polyester resin (a2) shows a sharp thermal behavior, which also contributes to improve the low temperature fixing properties of the electro-photographic toner.

The dendrimer mentioned by the present invention is polymer structure, which has at least one branched point having the dendritic branched structure of arbitrary shape.

Definitely, it is a concept represented by the dendrimer structure explained in the following document in full detail: Tomalia, D. A. et al.; Angew. Chem. Int. Ed. Engl., 29 volumes, pp. 138 (1990), Frechet, J. M. J. et al.; J. Am. Chem. Soc., 112 volumes, pp. 763 (1990), Vogtle, F. et al.; Angew. Chem., Int. Ed. Engl., 38 volumes, pp. 885 (1999), or Masaaki Kakimoto; Chemicals, 50 volumes, pp. 608 pages (1995), or the like.

The dendrimer represents super-branched structure and has one focal point (focus).

The focal point is the central point of a super-branched structure or the starting point of dendritic divergence. More precisely, it is meant that the end branched point in the case of going back a chain in the convergence direction of branch from any branched terminal of dendritic structure.

It is known that a dendrimer will be a globular macromolecule because a divergence end is quickly crowded with increase of molecular weight.

The molecular diameter is known within the range of one-tens of nm.

By the range of this molecular diameter is adjusted, an interval for the obtained admolecule can be changed.

In the present invention, the definition of a dendrimer is in accordance with the branching written in "Dendrimer no kagaku to kinou (the science and the function of a dendrimer)." [Jul. 20, 2000, Issued by ICP K.K., writing and editing by Masahiko Okada], and it can be manufactured with the compositing method by a description of this book.

A method of a synthesizing method of dendrimer type polyester resin, which is an example of the polyester resin (a2) are listed as follows: for example, by reacting the compound which has two or more hydroxyl groups per molecule with the compound which has one carboxyl group per molecule and two or more hydroxyl groups, and the reactant which contains a hydroxyl group at the end is obtained; after that, the hydroxyl group having in the reactant is to react with the carboxyl group of the compound which has one carboxyl group per molecule and two or more hydroxyl groups, etc.

In detail, for example, a method is listed that: the compound which has two or more hydroxyl groups per molecule reacts with the compound which has one carboxyl group per molecule and two or more hydroxyl groups; after obtaining the structure formed via the ester bond with the core structure having its origin in the compound which has two or more hydroxyl groups and branch structure having its origin in of the compound which has one carboxyl group and two or more hydroxyl groups; further, the hydroxyl group having in the branch structure and the carboxyl group of the compound which has one carboxyl group and two or more hydroxyl groups is made to react, etc.

In the above method, the compound that has two or more hydroxyl groups into one molecule is used as a starting material (core part); the core part is performed a condensation reaction with a compound which has a carboxyl group and a two or more hydroxyl group in one molecule simultaneously; and the first generation branch is to be formed.

Subsequently, the terminal hydroxyl groups of the first generation branch is carried out the condensation reaction with the compound that has simultaneously a carboxyl group and two or more hydroxyl groups; thus, the second generation branch of is made to be formed.

The dendrimer type polyester resin that has a desired generation number and a hydroxyl value can be obtained by repeating this generation of the formation.

As a compound that has a hydroxyl group to form the core part, a monovalent or a polyhydric alcohol is listed. As a monovalent alcohol, for example, octanol, stearyl alcohol, an eicosanol, etc., can be listed.

As a polyhydric alcohol, for example, a divalent alcohol, the alcohol more than trivalent, etc., are enumerated.

As the divalent alcohol, they are listed, for example: aliphatic series divalent alcohol, such as, ethylene glycol, 1,2-propylene glycol, 1,4-butanediol, 1,5-pentanediol, 1,6-hexandiol, diethylene glycol, dipropylene glycol, triethylene glycol, neopentyl glycol; aromatic divalent alcohol, such as bisphenol A, bisphenol A derivatives, such as a polyalkylene oxide addition product of bisphenol A; and alicycle group divalent alcohol, such as cyclohexane dimethanol.

Also, an aliphatic series mono epoxy compound, such as Cardura E10 (Monoglycidyl ester of branched-chain fatty acid, produced by Shell Chemical Inc.,) can also be used as divalent alcohol.

As above-mentioned alcohol more than trivalent, for example, glycerol, pentaerythritol, dipentaerythritol, trimethylolethane, trimethylolpropane, 2-methylpropane-triol, etc., are listed.

These alcohols can be used independently or be mixed two kinds or more. A condensation reaction may be carried out under pressure in consideration with reaction temperature and boiling point of the monomer.

As the number of hydroxyl groups of the compound that has two or more hydroxyl groups per molecule, the range of 2-6 is preferred, and the range of 2-4 is more preferred.

As the above-mentioned compound that has one carboxyl group and two or more hydroxyl group in one molecule simultaneously, various kind of polyhydroxy monocarboxylic acid can be used. For example, dimethylol butanoic acid, dimethylol propionic acid, 5-hydroxy isophthalic acid, 3,5-dihydroxybenzoic acid, these derivatives, etc., are listed.

These polyhydroxy monocarboxylic acid can be used independently or be mixed two kinds or more.

As the number of the hydroxyl groups of a compound having one carboxyl group and two or more hydroxyl group in one molecule simultaneously, the range of 2-6 is preferred, and the range of 2-4 is more preferred.

In case of being react the compound (a1) with the polyester resin (a2), an other polyester resin may be used with them in the range which does not spoil the effect of the present invention.

The thermal properties and viscoelasticity behavior in polyester resin (a2) and the other polyester resin is different by the difference in a molecular weight distribution. Therefore, by mixing these, the resin composition can also be adjusted for demanding toner performance.

As the other polyester resin, for example, as the polyester resin which has a hydroxyl group, the polyester resin obtained in the following methods, etc., can be listed.

The process of manufacture 1: A method to perform dehydration condensation, wherein being indispensable for a divalent alcohol, a divalent carboxylic acid, and an alcohol more than trivalent; using a monovalent carboxylic acid and a monovalent alcohol as required; and heating them under a nitrogen gas atmosphere and a catalyst existence.

The process of manufacture 2: A method to perform ring opening and esterifying by addition of the epoxy group with carboxylic acid, wherein being indispensable for an epoxy resin and divalent carboxylic acid; using the carboxylic acid more than trivalent, a monovalent carboxylic acid, a monovalent alcohol, an alcohol more than divalent, etc., as required; and heating them under an air atmosphere.

The polyester resin which has a carboxyl group is listed, for example, the polyester resin obtained in the following processes of manufacture, etc.

Process of manufacture 3: A method to perform dehydration condensation, wherein being indispensable a divalent alcohol, a divalent carboxylic acid, and a carboxylic acid more than trivalent; using monovalent carboxylic acid and monovalent alcohol as required; and heating under a nitrogen gas atmosphere and catalyst existence.

In addition, in the process 1 or the process 2, depressurization method can be used as required.

As the divalent carboxylic acid used in the above-mentioned process of manufacture 1-process of manufacture 3, for example, aliphatic series divalent carboxylic acid, such as adipic acid and sebacic acid; aromatic divalent carboxylic acid, such as orthophthalic acid, phthalic anhydride, isophthalic acid, terephthalic acid, succinic acid, and succinic anhydride, can be listed.

The divalent carboxylic acid may be used by itself and may be used two or more kinds at once.

As the alcohol used by the above-mentioned process of manufacture 1-process of manufacture 3, for example, the alcohol which can be used for preparing the above-mentioned dendrimer type polyester resin, etc., are listed.

As the epoxy resin used in the above-mentioned process of manufacture 2, for example, a bisphenol type epoxy resin, a phenol novolak type epoxy resin, a cresol novolak type epoxy resin, a naphthalene type epoxy resin, a biphenyl type epoxy resin, etc., can be enumerated.

These may be used independently or may be used two or more kinds of them together.

As the polyvalent carboxylic acid more than trivalent used by the above-mentioned process of manufacture 2 or the process of manufacture 3, for example, trimellitic acid, trimellitic anhydride, cyanuric acid, pyromellitic acid, pyromellitic dianhydride, etc., are listed.

These may be used independently and may be used two or more kinds at the same time.

Further, as the above-mentioned process of manufacture 1-process of manufacture 3, a hydroxycarboxylic acid which has a hydroxyl group and a carboxyl group simultaneously can be used.

For example, dimethylol butanoic acid, dimethylol propionic acid, 5-hydroxy isophthalic acid, 3,5-dihydroxybenzoic acid, malic acid, and these derivatives are listed.

These may be used independently and may be used two or more kinds of them together.

As the other polyester resin, for example, polyester resin which does not have regularity in branched structure (The polyester resin which has irregularity of branched structure) can be listed.

As the polyester resin which has irregularity of branched structure, for example, hyperbranched polymer that is the mixtures of polymers varied in the molecular weight and the degree of branching, etc., are listed.

The hyperbranched polymer is synthesized, for example, by self-condensation reaction of the so-called $AB_x$ type molecule, which has a total of three or more reactive functional groups of two kinds in one molecule.

Therefore, although the molecular weight distribution of the dendrimer formed by every generation is mono dispersion theoretically, in contrast, since hyperbranched polymer has difficulty to control of a molecular weight distribution, the molecular weight distribution becomes large inevitably.

As the synthesizing method of hyperbranched polymer, for example, the self-condensation of the polyhydroxy monocarboxylic acid used by synthesis of the above-mentioned dendrimer, etc., are listed.

The polyester resin (A) used in the present invention, as above-mentioned, for example, cab be obtained by reacting the compound (a1) and the polyester resin (a2).

A compound (a1) has an alkyl group in the range of 20-80 carbon atoms or an alkenyl group in the range of 20-80 carbon atoms.

These alkyl groups and alkenyl groups are group which have the structure of a orderly arrangement.

By using the compound (a1) as a raw material of polyester resin, crystal structure is given to the polyester resin.

Therefore, the polyester resin (A) used by the present invention becomes crystalline polyester resin.

In the present invention, "crystallinity" means the property to have the crystal structure of a lamellae crystal type or a spherulite type, etc., originating in the regular array structure existing in the resin skeleton and to have independent or plurality of endothermic peak originating in the heat of fusion in crystal generated in the time of melting the crystal structure by heat.

As the method which makes a compound (a1) and a polyester resin (a2) react, the method of publicly known and commonly use can be used.

For example, the method of making dehydration condensation is used preferably. In case that the polyester resin which has a hydroxyl group is selected as polyester resin (a2), as a compound (a1), the monocarboxylic acid having an alkyl group in which the number of carbon atoms is the range of 20-80, or the monocarboxylic acid having an alkenyl group in which the number of carbon atoms is the range of 20-80 are selected. Then, the polyester resin which has this hydroxyl group, monocarboxylic acid having an alkyl group in which the number of carbon atoms is the range of 20-80 or monocarboxylic acid having an alkenyl group in which the number of carbon atoms is 2 the range of 20-80 are heated under a nitrogen gas atmosphere in the presence of a catalyst.

As for the weight-average molecular weight of the tetrahydrofuran-soluble fractions of the polyester resin (A) used in the present invention, the range of 1,000-100,000 is preferred, and the range of 1,500-90,000 is more preferred. Accordingly, it becomes a composition, which can be obtained the electro-photographic toner being superior in low temperature fixing properties and in blocking resistance.

Further, in the present invention, measurement of weight-average molecular weight is used the gel-permeation-chromatography (GPC) method and is carried out in the following conditions:

Measuring apparatus; HLC-8120GPC product by TOSOH CORP. Column; TSK-GUARDCOLUMN $H_{XL}$-H product by TOSOH CORP.
TSK-GEL $G5000H_{XL}$ product by TOSOH CORP.
TSK-GEL $G4000H_{XL}$ product by TOSOH CORP.
TSK-GEL $G3000H_{XL}$ product by TOSOH CORP.
TSK-GEL $G2000H_{XL}$ product by TOSOH CORP.
Detector; RI (differential refractometer)
Data processing; Multi-station GPC-8020 model II product by TOSOH CORP.
Measurement condition; column temperature 40° C.
Solvent Tetrahydrofuran
Rate of flow 1.0 mL/minute
Standard; monodisperse polystyrene
Sample; tetrahydrofuran solution, in 0.4% of the weight in resin-solid-content conversion, filtered with the microfilter (100 micro-L)

Less than 10% insoluble part in the tetrahydrofuran for the polyester resin (A) used in the present invention is desirable, and less than 5% is more preferred. Thereby, the electro-photographic toner, which is superior in the low temperature fixing properties, can be obtained.

In the present invention, measurement of the insoluble part in tetrahydrofuran was carried out in following still-standing method.

<Measurement of Insoluble Fraction in Tetrahydrofuran>

The polyester resin 1.5 g passed over the sieve of 710 micrometers of openings is weighed, and it puts into the wire gauze of 500 meshes.

This wire gauze is immersed in the well-closed container containing 80 g of tetrahydrofuran and is settled for 24 hours. The wire gauze is taken out after 24 hours and is dried at a 70° C. dryer for 1 hour.

The dried wire gauze is cooled at a room temperature, and the wire gauze is weighed.

The insoluble part is calculated in the following equation.

Insoluble part (%)=the wire gauze weight after immersion/the wire gauze weight before the immersion containing the weight of the resin*100

As for the melting point of the polyester resin (A) used by the present invention, the range of 45-165° C. is preferred, and the range of 50-160° C. is more preferred. This enables to obtain the electro-photographic toner which is superior in low temperature fixing properties and in blocking resistance.

In the present invention, a melting point or a glass transition point of the polyester resin (A) and the polyester resin (B) as described later is determined by using the differential scanning calorimetry (DSC) method in the following conditions.

Measuring apparatus; DSC-220C by Seiko Instruments, Inc.
Data processing; EXSTAR 6000 PC station
Measurement condition; 1. raise temperature (10° C./min) from 0° C. to 200° C.
2. maintain for 10 minutes at 200° C.
3. lower temperature from 200° C. to 0° C. (10° C./min).
4. maintain for 10 minutes at 0° C.
5. raise temperature (10° C./min) from 0° C. of to 200° C.

Analysis; In the measurement result of 5., by following the method described in JIS K7121 (9.1 "how to determine for a melting temperature"), the maximum endothermic peak temperature of heat of fusion was determined, and it was made as the melting point. Also, an intermediate glass transition temperature was determined for in accordance with a method described to this standard (9.3 "how to determine for glass transition temperature").

The polyester resin (A) used in the present invention may be used independently, or two or more kinds of them may be used together.

The polyester resin (B) used in the present invention is prepared by using a carboxylic acid which has an aliphatic hydrocarbon group and/or an alcohol which has an aliphatic hydrocarbon group as indispensable, and in addition, it has crystal structure.

Such the polyester resin (B) has excellent compatibility with the polyester resin (A).

The polyester resin (B) can be synthesized by using, for example, a divalent carboxylic acid and a divalent alcohol which give crystallinity to polyester resin, in addition, further, the divalent carboxylic acid which has an aliphatic hydrocarbon group and the divalent alcohol which has an aliphatic hydrocarbon group.

As the divalent carboxylic acid which gives crystallinity to the above-mentioned polyester resin, for example, adipic acid, sebacic acid, etc., can be listed.

As the divalent alcohol which gives crystallinity to the above-mentioned polyester resin, for example, 1,4-butanediol, 1,5-pentanediol, 1,6-hexanediol, etc., can be enumrated.

As the divalent carboxylic acid as the example, which has an aliphatic hydrocarbon group used for preparation of polyester resin, for example, as for the above-mentioned divalent carboxylic acid, maleic acid, maleic anhydride, fumaric acid, itaconic acid, itaconic acid anhydride, oxalic acid, malonic acid, succinic acid, succinic anhydride, dodecylsuccinic acid, dodecylsuccinic anhydride, dodecenyl succinic acid, dodecenyl succinic anhydride, adipic acid, azelaic acid, sebacic acid, decane-1,10-dicarboxylic acid, etc., can be listed.

Moreover, a divalent carboxylic acid of an aromatic group or an alicycle group, a polyvalent carboxylic acid more than trivalent, and a monovalent carboxylic acid can also be used in the range, which does not spoil the effect of the present invention.

As the divalent carboxylic acid of an aromatic or an alicycle group, for example, phthalic acid, phthalic anhydride, a tetrahydrophtal acid and its anhydride, hexahydrophthalic acid and its anhydride, tetra bromine phthalic acid and its anhydride, tetrachlorophthalic acid and its anhydride, HET acid and its anhydride, himic acid and its anhydride, isophthalic acid, terephthalic acid, cyclohexanedicarboxylic acid, 2,6-naphthalene dicarboxylic acid, anthracene dicarboxylic acid, etc., are to be listed.

As the above-mentioned carboxylic acid more than trivalent, for example, trimellitic acid, trimellitic anhydride, methylcyclohexene tricarboxylic acid, methylcyclohexene tricarboxylic anhydride, pyromellitic acid, pyromellitic dianhydride, etc., can be enumrated.

As the above-mentioned monovalent carboxylic acid, for example, benzoic acid, p-tert-butyl benzoic acid, etc., can be listed.

The above-mentioned carboxylic acid may be used independently, respectively, and may be used two or more kinds of them at once.

Further, a part or the entire carboxyl group of the above-mentioned polyvalent carboxylic acid becomes alkyl ester, alkenyl ester, or aryl ester can also be used.

Also, furthermore, the compound which has a hydroxyl group and a carboxyl group in one molecule simultaneously or these reactive derivatives can also be used. For example, they are hydroxy acid as a component material of three organic function groups, such as dimethylol butanoic acid or dimethylol propionic acid, or 6-hydroxy hexanoic acid, etc.

As the divalent alcohol which has the above-mentioned divalent aliphatic hydrocarbon group, for example, ethylene glycol, 1,2-propylene glycol, 1,4-butanediol, 1,5-pentanediol, 1,6-hexandiol, diethylene glycol, diethylene glycol, dipropylene glycol, triethylene glycol, neopentyl glycol, etc., can be listed.

Also, a divalent alcohol of aromatic or alicycle group, a polyhydric alcohol more than trivalent, and a monovalent alcohol can also be used in the range which does not spoil an effect of the present invention.

As the divalent alcohol of aromatic group or alicycle group, it is listed, for example, a bisphenol type, such as bisphenol A, bisphenol S, bisphenol F, a polyalkylene oxide adduct of bisphenol A, a polyalkylene oxide adduct of bisphenol S, and aromatic diol, such as bisphenol derivatives, alkylene oxide adduct of bisphenol or the like, such as a polyalkylene oxide adduct of the bisphenol F; and a diol of alicycle groups, such as cyclohexane dimethanol.

As a polyalkylene oxide adduct of the above-mentioned bisphenol A, for example, the ethyleneoxide adduct of bisphenol A, the propylene oxide adduct of bisphenol A, etc., are listed.

As a polyalkylene oxide adduct of the above-mentioned bisphenol S, for example, the ethyleneoxide adduct of the bisphenol S, the propylene oxide adduct of the bisphenol S, etc., are listed.

As a polyalkylene oxide adduct of the above-mentioned bisphenol F, for example, the ethyleneoxide adduct of the bisphenol F, the propylene oxide adduct of the bisphenol F, etc., can be listed.

Also, an aliphatic series mono epoxy compound such as "Cardura E10" [Monoglycidyl ester of branched-chain fatty acid, produced by of Shell Chemical Inc.,] etc., can also be used as these diol.

As above-mentioned alcohol more than trivalent, for example, glycerin, trimethylolethane, trimethylolpropane, sorbitol, 1,2,3,6-hexane tetrol, 1,4-sorbitan, pentaerythritol, dipentaerythritol, 2-methylpropane triol, 1,3,5-trihydroxybenzene, tris-(2-hydroxyethyl) isocyanurate, etc., can be listed.

Also, a poly epoxy compound as shown below can also be used as an alcohol more than trivalent. For example, various kinds of poly glycidylethers of aliphatic series or alicyclic polyol, such as ethylene glycol, hexandiol, neopentyl glycol, trimethylolpropane, trimethylolethane, glycerin, pentaerythritol, sorbitol, etc.;

various kinds of poly glycidylethers of polyether polyol, such as, polyethylene glycol, polypropylene glycol, or polytetramethylene glycol; a kind of poly glycidylethers of tris-(2-hydroxyethyl) isocyanurate; various kinds of poly glycidyl esters of aliphatic series or aromatic series polycarboxylic acids, such as, adipic acid, butanetetracarboxylic acid, propane tricarboxylic acid, phthalic acid, terephthalic acid, or trimellitic acid; various kinds of bisepoxide of hydrocarbon system diene, such as, butadiene, hexadiene, octadien, dodecadiene, cyclo-octadiene, alpha-pinene, or vinylcyclohexen; various kinds of alicyclic poly epoxy compounds, such as bis-(3,4-epoxycyclohexylmethyl)adipate, 3,4-epoxycyclohexylmethyl-3,4-epoxycyclohexylcarboxylate; or, various kinds of epoxidation products of diene polymer, such as polybutadiene or polyisoprene; and poly epoxy compounds, such as "EGM-400" [The brand name of annular polysiloxane, which has 3-glycidoxy propyl group, produced by Dow Corning Toray Silicone Co., Ltd.], can be listed.

Further, the polyvalent epoxy compound which has two or more epoxy groups in one molecule can also be used as a polyhydric alcohols.

For example, divalent-tetravalent epoxy compound, an epoxy compound more than pentavalence, etc., are listed.

As the above-mentioned divalent-tetravalence epoxy compound, for example, a bisphenol A type epoxy resin, novolak type epoxy resin, ethylene glycol diglycidyl ether, glycerol triglycidyl ether, trimethylolpropane triglycidyl ether, trimethylolethane triglycidyl ether, pentaerythritol tetraglycidyl ether, hydroquinone diglycidyl ether, etc., can be enumerated.

Among these, since resistance to plasticizer is satisfactory, a bisphenol A type epoxy resin is preferred.

As the above-mentioned epoxy compound more than pentavalence, for example, cresol novolak type epoxy resin, phenol novolak type epoxy resin, a polymer or copolymer of a vinyl compound which has an epoxy group, resorcinol epoxides-acetone condensate, partial-epoxidated polybutadiene, etc., is listed.

In these, since reactivity is favorable, cresol novolak type epoxy resin and phenol novolak type epoxy resin are more desirable.

In addition, the above-mentioned divalent-tetravalence epoxy compound and the epoxy compound more than pentavalence can be used two or more kinds at once.

The above-mentioned alcohol may be used independently or can also be used two or more kinds of them together.

Further, the monovalent higher alcohol, such as stearyl alcohol, other than these polyhydric alcohol classes, etc., can be used together in the range which does not spoil the feature of the present invention.

The polyester resin (B) used in the present invention may be sufficient either straight chain structure or branched structure. For the reason that compatibility is favorable by having similar structure of polyester resin (A), a polyester resin that has branched structure is preferred.

In the polyester resin which has branched structure, the polyester resin, which main skeleton is a multi-branched state polyester structure having the structure expressed by the above-mentioned structural formula (1) as a repeating unit is preferred.

For example, as such polyester resin, dendrimer type polyester resin, etc., can be listed.

A hyper-branch type polyester resin can also be exemplified as polyester resin, which has branched structure.

The hyper-branch type polyester resin, for example, is synthesized by self-condensation of so-called $AB_X$ type molecule that has a total of three or more reactive functional groups of two kinds in one molecule.

Therefore, the molecular weight distribution of the dendrimer type polyester resin formed for every generation is mono dispersion, theoretically. On the other hand, as for hyper-branch type polyester resin, controlling of the molecular weight distribution is difficult, and the molecular weight distribution becomes large, inevitably.

As the synthesizing method of hyper-branch type polyester resin, for example, the self-condensation of the polyhydroxy monocarboxylic acid used by synthesis of the above-mentioned dendrimer type polyester resin, etc., are listed.

As for the weight-average molecular weight of the tetrahydrofuran-soluble fractions of the polyester resin (B) used in the present invention, the range of 5,000-300,000 is preferred, and the range of 6,000-250,000 is more preferred. Accordingly, the electro-photographic toner which is superior in low temperature fixing properties and in hot offset resistance can be obtained.

As for the melting point or glass transition point of the polyester resin (B) used in the present invention, 45-165° C. is preferred and 50-160° C. is more preferred. Thereby, the electro-photographic toner which is superior in low temperature fixing properties and in hot offset resistance is retrievable.

In the resin composition for an electro-photographic toner of the present invention, the content of the polyester resin (A is preferred to the range of 0.1-50 weight sections and is more preferred to the range of 1-20 weight sections) to a total of 100 weight sections of polyester resin (A) and polyester resin (B). This is for a reason with coexistence of low temperature fixing properties and hot offset resistance.

The electro-photographic toner in the present invention contains the resin composition for an electro-photographic toner in the present invention.

In detail, the electro-photographic toner in the present invention can be obtained as follows: for example, additives, such as a colorant, a release agent (wax), and an electrification controlling agent, are added to the resin composition for an electro-photographic toner of the present invention, as required. Subsequently, melt kneading is carried out above the melting point of resin of the resin composition for an electro-photographic toner of the present invention. Then, it is ground and classified. Of course, it may be manufactured by the other method of the above.

As the above-mentioned colorant, for example, various types of organic pigments, an inorganic pigment, a dye, etc., can be used.

In detail, for example, carbon black, lamp black, aniline blue, calcoil blue, ultra marine blue, copper phthalocyanine blue, chrome yellow, pigment yellow L, titan yellow, rose red ocher, quinacridone red, watching red, etc., can be listed. In addition, these can be used in one kind or in a combination of two kinds or more.

The weight percentage of the colorant in the electro-photographic toner in the present invention is not restricted in particular. However, in general, the range of 1-60 weight sections of colorants is per 100 weight sections of an electro-photographic toner, and the range of 3-30 weight sections is more preferable.

As the above-mentioned release agent, for example, the followings are listed: synthetic waxes, such as a polypropylene wax, a polyethylene wax, a Fischer-Tropsch wax, a stearyl bisamide, and an oxidation wax; and natural waxes, such as a carnauba wax, a montan wax, a candelilla wax, and a rice wax, etc.

These can be used in one kind or two kinds or more in combination.

As a suitable release agent, for example, there are BISUKORU 660P, BISUKORU 550P [produced by Sanyo Chemical Industries, Ltd.], which are synthetic polypropylene waxes, etc.

In the present invention, even if it uses polyester resin (A) independently as a release agent, a mold-release characteristic can fully be exhibited. However, by using in combination with the above-mentioned general release agent is also enabled.

In the case, it can be used, usually, the range of 0.1-10 weight sections of release agents per 100 weight sections of an electro-photographic toner, and the range of 1-5 weight section(s) is favorable.

As the above-mentioned electrification controlling agent, the charge controlling agent of publicly known common use, such as a acid dye including heavy metals, can be listed. For example, a nigrosine series dye, a quarternary ammonium salt, a tri-methyl ethane system dye, copper phthalocyanine, perylene, quinacridone, azo pigment, metallic complex azo dye, etc., can be used for this heavy metal content acid dye. In addition, one kind or two kinds or more of them can be combined and used.

In particular, the weight percentage of the electrification-controlling agent in the electro-photographic toner of the present invention is not restricted. However, preferably, the range of 0.5-3 weight sections of electrification controlling agents per 100 weight sections of an electro-photographic toner is desirable.

In order to acquire an electro-photographic toner of the present invention, in any processes of the manufacture, various assistants, such as a flow improver, can be added.

As for the flow improver, it is effective to attach on the surface of the electro-photographic toner.

Further, Electro-photographic toner obtained in the present invention can be used as toner by itself. However, by adding silica externally, flowability of fine particles can be improved more, and it is suitable practically.

There are some comparatively large mean particle diameter silica, and there are some comparatively small mean particle diameter silica. These may be used independently or may be used together. As an amount of externally adding silica, the range of 0.1-5.0 weight sections is preferred practically to 100 weight sections of an electro-photographic toner particles. Thereby, electrification quantity becomes enough to be required, and the photo conductor drum is not damaged or aggravation of the environmental capability of toner is not incurred.

EXAMPLES

Then, the present invention is explained in detail by using an example.

In the example, the "part" shall show a weight section, as there is no notice expressly.

The Synthetic Example 1

Synthesis of Polyester (A)

In 3 L stainless steel flask of 4 openings, which provides an agitator, a nitrogen gas feed port, and a thermometer, 107.2 g of trimethylolpropane, 321.6 g of dimethylol propionic acid, and 0.20 g of p-toluenesulfonic acid were prepared. Then, with stirring, temperature rising is performed to 130° C.

Further, temperature rising with decompressing was carried out to 140° C. for 0.5 hour.

Advance of a reaction was identified by change of an acid number. This identification was performed by cancelling the reduced pressure and by putting in nitrogen gas.

It continued the reduced pressure at 140° C. until one or less acid value, and an acid value became one or less is checked.

It added 643.2 g of dimethylol propionic acid to this reactant. The reaction was advanced until one or less acid value with decompressing at 140° C.

Verification of one or less acid value is done. After that, furthermore, 1286.4 g of dimethylol propionic acid is added to this reaction mixture. A reaction was progressed with decompressing at 140° C. until one or less acid value.

When it becomes one or less acid value, a reduced pressure is canceled with adding nitrogen gas. 2056.0 g (molar quantity of the raw material used for preparation is 17.6 mol) reaction mixture (a2-1) as polyester resin (a2) was obtained.

The hydroxyl value of this reaction mixture (a2-1) was 524 mg KOH/g.

1710.0 g (molar quantity of a raw material used for preparation is 14.6 mol) of this reaction mixture (a2-1) was move to an another 3 L stainless steel flask of 4 openings, which provides an agitator, a nitrogen gas feed port, and a thermometer and was prepared independently. Subsequently, 622.9 g (1.8 mol) of behenic acid (22 carbon atoms) was put as a compound (a1).

Further, 1.0 g of dibutyltin oxide was put in, and it reacted under a 140° C. under reduced pressure for 5 hours with stirring. Then, the branched crystalline polyester (A1) having multi-branched state polyester structure, which has the structure expressed by the above-mentioned structural formula (1) as a repeating unit (an average of n is 2.7), in a main skeleton was obtained.

For the branched crystalline polyester (A1), an acid value is 1.2 mg KOH/g, weight-average molecular weight calculated by GPC is 4500, a tetrahydrofuran-insoluble fractions is 0%, and a melting point measured by DSC is 46

Also, the content of the alkyl group originated in the behenic acid in branched crystalline polyester (A1) is 27.1% of the weight.

The amount of the behenic acid used was 11.1 mol % to the total molar quantity of the molar quantity of behenic acid (1.8 mol,) and the molar quantity of the raw material (14.6 mol) used for preparation of the above-mentioned reaction mixture (a2-1).

The Synthetic Example 2

Same as the Above 830.0 g (the molar quantity of a raw material used for preparation is 7.1 mol) was used as the reaction mixture (a2-1), and 1551.9 g (4.6 mol) of the behenic acid was used. Further point was the same as that of the synthetic example 1, and branched crystalline polyester (A2) was obtained.

An acid value of the resin is 1.4 mg KOH/g, weight-average molecular weight calculated by GPC is 6200, a tetrahydrofuran insoluble fractions is 0%, and a melting point measured by DSC was 52° C.

In addition, content of an alkyl group originated in behenic acid in branched crystalline polyester (A2) is 67.5% of the weight.

The amount of the behenic acid used was 39.1 mol % to the total molar quantity of behenic acid molar quantity (4.6 mol) and the molar quantity (7.1 mol) of the raw material used for preparation of the above-mentioned reaction mixture (a2-1).

The Synthetic Example 3

Same as the Above

In 3 L stainless steel flask of 4 openings, which provides an agitator, a nitrogen gas feed port, and a thermometer, by putting in 108.8 g of pentaerythritol, 428.8 g of dimethylol propionic acid, and 0.20 g of p-toluenesulfonic acid, temperature rising was carried out to 130° C. with stirring.

Further, temperature rising with decompressing was carried out to 140° C. for 0.5 hour.

Advance of a reaction was identified by change of an acid value, the identification was performed by canceling a reduced pressure with adding nitrogen gas.

A reduced pressure was continued at 140° C. until it becomes one or less acid value, was checked the an acid value become one or less, and 480.0 g (4.0 mol) of a reaction mixture (a2-2) as the polyester resin (a2) was extracted.

The hydroxyl value of the reaction mixture (a2-2) was 748 mg KOH/g.

471.0 g (molar quantity of a raw material used for preparation is 3.9 mol) of this reaction mixture (a2-2), is moved to another 3 L stainless steel flask of 4 openings which was provided an agitator, a nitrogen gas feed port, and a thermometer and was prepared independently. Subsequently, 1930.0 g (5.7 mol) behenic acid was put in as a compound (a1).

Further, 1.0 part of dibutyltin oxide is put in, and it is reacted at 140° C. under reduced pressure for 5 hours with stirring. Then, branched crystalline polyester (A3) having multi-branched state polyester structure, which has the structure expressed by the above-mentioned structural formula (1) as a repeating unit (the average of "n" is 3.5), in a main skeleton was obtained.

In addition, content of an alkyl group originated in behenic acid origin in branched crystalline polyester (A3) is 84.0% of the weight.

In branched crystalline polyester (A3), an acid value was 2.2 mg KOH/g, weight-average molecular weight calculated by GPC was 8600, a tetrahydrofuran-insoluble fractions was 0.1%, and a melting point measured by DSC was 55° C.

The amount of the used behenic acid was 59.1 mol % to the total molar quantity of the molar quantity of behenic acid (5.7 mol) and the molar quantity of the raw material (3.9 mol) used for preparation of the above-mentioned reaction mixture (a2-2).

The Synthetic Example 4

Same as the Above

Instead of 622.9 g of behenic acid, 1011.6 g (1.4 mol) pentacontanoic acid (50 carbon atoms) was used, and 1314.0 g (molar quantity of a raw material used for preparation is 11.2 mol) of the reaction mixture (a2-1) was used. Except for them, a branched crystalline polyester (A4) is obtained in the similar manner to the synthetic example 1.

In addition, in branched crystalline polyester (A4), content of an alkyl group originated in pentacontanoic acid is 44% of the weight.

In the branched crystalline polyester (A4), the acid value of was 1.6 mg KOH/g, the weight-average molecular weight calculated from GPC was 11800, the tetrahydrofuran-insoluble fractions was 0.1%, and the melting point measured from DSC was 80° C.

The amount of pentacontanoic acid used was 10.9 mol % to total molar quantity of molar quantity (1.4 mol) of pentacontanoic acid, and molar quantity (11.2 mol) of a raw material used for preparation of the above-mentioned reaction mixture (a2-1).

The Synthetic Example 5

Same as the Above 1886.6 g (2.6 mol) pentacontanoic acid is used instead of 622.9 g of behenic acid. Except for having used 459. Og (molar quantity of a raw material used for preparation is 3.9 mol) of reaction mixtures (a2-1), a branched crystalline polyester (A5) was obtained in the similar manner to the synthetic example 1.

In branched crystalline polyester (A5), content of an alkyl group originated in pentacontanoic acid is 82.1% of the weight.

In branched crystalline polyester (A5), the acid value was 2.3 mg KOH/g, the weight-average molecular weight calculated by GPC was 13400, the tetrahydrofuran-insoluble fractions is 0.1%, and the melting point measured by DSC was 87° C.

The amount of used pentacontanoic acid was 39.6 mol % to the total molar quantity of the molar quantity of pentacontanoic acid (2.6 mol) and the molar quantity of the raw material (3.9 mol) used for preparation of the above-mentioned reaction mixture (a2-1).

The Synthetic Example 6

Same as the Above 2104.5 g (2.9 mol) pentacontanoic acid is used instead of 1930.0 g behenic acid. 244.0 g (the molar quantity of the raw material used for preparation is 2.0 mol) of a reaction mixture (a2-2) was used. A branched crystalline polyester (A6) was obtained in the similar manner for the synthetic example 3 in further point.

In the branched crystalline polyester (A6), the acid value is 4.3 mg KOH/g, the weight-average molecular weight calculated by GPC is 15900, the tetrahydrofuran-insoluble fractions is 0.2%, and the melting point measured from DSC by 91° C.

The content of the alkyl group of the pentacontanoic acid origin in branched crystalline polyester (A6) is 91.6% of the weight.

The amount of pentacontanoic acid used was 58.6-mol % to the total molar quantity of the molar quantity of pentacontanoic acid (2.9 mol) and the molar quantity of the raw material (2.0 mol) used for preparation of the above-mentioned reaction mixture (a2-1).

Synthetic Example 7

Synthesis of Branched State Polyester (A') for Comparison and Contrast 537.6 g (1.9 mol) of stearic acid (18 carbon atoms) was used instead of 622.9 g of behenic acid. A reaction mixture (a2-1) was used for 1797.0 g (molar quantity of a raw material used for preparation is 15.4 mol). The branched crystalline polyester for comparison and contrast (A'1) was obtained in the similar manner as that of the synthetic example 1 in further point.

In the branched crystalline polyester (A'1), the content of the alkyl group origin in stearic acid is 23.4% of the weight.

In the branched crystalline polyester (A'1), the acid value is 1.1 mg KOH/g, the weight-average molecular weight calculated by GPC is 4000, the tetrahydrofuran-insoluble fractions is 0%, and the melting point measured by DSC was 32° C.

The amount of stearic acid used was 10.9 mol % to total molar quantity of molar quantity of stearic acid (1.9 mol) and molar quantity of a raw material (15.4 mol) used for preparation of the above-mentioned reaction mixture (a2-1).

The Synthetic Example 8

Same as the Above 1465.0 g (5.2 mol) stearic acid was used instead of 622.9 g of behenic acid. 929.0 g (molar quantity of the raw material used for preparation is 8.0 mol) of a reaction mixture (a2-1) was used. The branched crystalline polyester for comparison and contrast (A'2) was obtained in the similar manner for the synthetic example 1 in further point.

In the branched crystalline polyester (A'2), content of an alkyl group originated in stearic acid is 63.7% of the weight.

In the branched crystalline polyester (A'2), the acid value is 1.9 mg KOH/g, the weight-average molecular weight calculated by GPC is 5600, the tetrahydrofuran-insoluble fractions is 0%, and the melting point measured by DSC was 39° C.

The amount of used stearic acid was 39.3 mol % to total molar quantity of molar quantity of stearic acid (5.2 mol) and molar quantity of a raw material (8.0 mol) used for preparation of the above-mentioned reaction mixture (a2-1).

The Synthetic Example 9

Same as the Above 1868.6 g (6.6 mol) stearic acid uses instead of 1930.0 g behenic acid. 550.0 g (the molar quantity of the raw material used for preparation is 4.6 mol) of a reaction mixture (a2-2) was used. The branched crystalline polyester for comparison and contrast (A'3) was obtained in the similar manner to the synthetic example 3 except for that.

In the branched crystalline polyester (A'3), content of an alkyl group originated in stearic acid is 81.2% of the weight.

In branched crystalline polyester (A'3), the acid value is 2.2 mg KOH/g, the weight-average molecular weight calculated by GPC is 7300, the tetrahydrofuran-insoluble fractions is 0%, and the melting point measured by DSC was 44° C.

The amount of the stearic acid used was 58.9-mol % to total molar quantity of molar quantity (6.6 mol) of stearic acid and molar quantity (4.6 mol) of a raw material used for preparation of the above-mentioned reaction mixture (a2-2).

The Synthetic Example 10

Same as the Above 1842.0 g (the molar quantity of the raw material used for preparation is 15.8 mol) of the reaction mixture (a2-1) was used, and 480.8 g (1.4 mol) of behenic acid was used. The branched crystalline polyester for comparison and contrast (A'4) was obtained in the similar manner to the synthetic example 1 in further point.

In the branched crystalline polyester (A'4), content of the alkyl group originated in behenic acid is 20.9% of the weight.

In the branched crystalline polyester (A'4), the acid value is 1.2 mg KOH/g, the weight-average molecular weight calculated by GPC is 3200, the tetrahydrofuran-insoluble fractions is 0%, and the melting point measured by DSC was 42° C.

The amount of used behenic acid was 8.2 mol % to total molar quantity of molar quantity of behenic acid (1.4 mol) and molar quantity of a raw material (15.8 mol) used for preparation of the above-mentioned reaction mixture (a2-1).

The Synthetic Example 11

Synthesis (B1) of Polyester Resin for a Binder

In 3 L stainless steel flask of 4 openings, which provides an agitator, the nitrogen gas feed port, and the thermometer, is provided. 731.2 g of ethylene glycol, 1674.8 g adipic acid, and 0.8 g of dibutyltin oxide are prepared. Temperature rising was carried out to 190° C. for 2 hours with stirring.

After making it react at 190° C. under an ordinary pressure nitrogen gas atmosphere for 4 hours, temperature rising was carried out to 200° C. with decompressing for 0.5 hour.

By reacting at 200° C. under a reduced pressure for 4 hours, the reacted polyester resin for binders (B1) was obtained.

An acid value of the resin is 11.2 mg KOH/g, a weight-average molecular weight calculated by GPC is 32300, and a melting point measured by DSC was 47° C.

The Synthetic Example 12

Synthesis (B-2) of Polyester Resin for a Binder

In 3 L stainless steel flask of 4 openings having an agitator, the nitrogen gas feed port, and the thermometer is provided. 296.4 g of ethylene glycol, 498.2 g of neopentyl glycol, 765.6 g of terephthalic acid, 765.6 g of isophthalic acid, and 0.8 g of dibutyltin oxide were put in. The temperature rising with stirring was carried out to 190° C. for 2 hours under a nitrogen gas atmosphere.

The inside of a reaction system was pressurized to 0.2 MPa, and it reacted at 220° C. for 2 hours. Then, temperature rising was carried out to 240° C. for 2 hours. After it reacted at 240° C. for 1 hour, it returned to ordinary pressure and reacted for further 1 hour.

Then, by reacting under a reduced pressure for 4 hours, reacted polyester resin for binders (B-2) was obtained.

The acid value of the resin is 10.7 mg KOH/g, the weight-average molecular weight calculated by GPC is 15200, and the glass transition point measured by DSC was 60° C.

The Synthetic Example 13

Synthesis (B3) of Polyester Resin for Binders

In 3 L stainless steel flask of 4 openings, which an agitator, a nitrogen gas feed port, and a thermometer were provided, 1455.6 g 2,2-bis(polyoxyethylene-oxyphenyl)propane, 343.4 g terephthalic acid, 343.6 g isophthalic acid, and 0.7 g of dibutyltin oxide were put in. The temperature rising with stirring was carried out to 240° C. for 4 hours under a nitrogen gas atmosphere. By reacting at 240° C. for 6 hours, the polyester resin for binders (B3) was obtained.

An acid value of the resin is 11.7 mg KOH/g, a weight-average molecular weight calculated from GPC is 14700, and a glass transition point measured from DSC was 62° C.

Example 1

84 parts of polyester resin for a binder (B1), 5 parts of carbon black MA-11 (produced by Mitsubishi Chemical), 1 part of BONTRON S34 (electrification controlling agent produced by Orient Chemical Industries Co., Ltd.) and 10 parts of branched crystalline polyester (A1) was mixed with a Henschel mixer. Then, it is kneaded with a biaxial kneading machine, and the kneaded material was obtained.

The obtained kneaded material in this manner was ground and classified.

After mixing 3 part of silica R972 (produced by NIPPON AEROSIL CO., LTD.) with a Henschel mixer, it was sieved. Then, the resin composition for an electro-photographic toner was obtained.

5 parts of the obtained resin compositions and 95 parts of careers (silicon resin coating ferrite career) were mixed and stirred, and the electro-photographic toner 1 was adjusted.

The toner 1 was evaluated in accordance with the following valuation method about the low temperature fixing properties, the hot offset resistance, and the blocking resistance.

The evaluation result is shown in the first table.

<Evaluation of Low Temperature Fixing Properties>

Preset temperature of a hot calendar roll was changed from 80° C. to 210° C. by 5° C., and the solid printing was performed.

The test for fastness to the solid print portion is carried out. The image concentration before and after the examination is measured with the Macbeth densitometer (RD-918). When the ratio of the concentration value after the exfoliation to the value before the examination is displayed by %, the fixation starting temperature was determined at the temperature, which the value was more than 80%.

As this temperature lower, it becomes the favorable electro-photographic toner of low temperature fixing properties.

A criterion for evaluation of low temperature fixing properties was carried out as follows.

In addition, test for fastness was performed by using a Gakushin-type fastness-to-rubbing testing machine (load: 200 g, grinding operation: 5 stroke):

Double circle; incase that fixing starting temperature is less than 100° C.

Single circle; in case that fixing starting temperature is more than 100° C. and less than 105° C.

Triangle; in case that fixing starting temperature is more than 105° C. and less than 110° C.

Cross; in case that fixing starting temperature is more than 110° C.

<Evaluation Method of a Hot Offset Resistance>

When the preset temperature of a heat roller is changed from 80° C. to 210° C. by 5 A3, a solid print portion offsets in the same paper again and expresses as the minimum temperature that can be checked visually.

As this temperature is higher, it is shown that the offset resistance is satisfactory:

Double circle; incase that offset starting temperature is more than 170° C.

Single circle; in case that offset starting temperature is more than 150° C. and less than 170° C.

Triangle; in case that offset starting temperature is more than 130° C. and less than 150° C.

Cross; in case that offset starting temperature is less than 130° C.

However, even in case that it does not offset at an high temperature, the resin itself acted as a wax and had poor fixability to print media was evaluated as cross.

In addition, evaluation of fixing starting temperature and offset resistance was performed on the following heating-roller fixing machine conditions.

Material of the roll: Upper; polytetrafluoroethylene, Lower; silicone
  Upper roll load: 7 kg/350 mm
  Nip width: 4 mm
  Paper pass velocity: 280 cm/sec <A Valuation Method of Blocking Resistance>

The toner, which left for 48 hours under environment of 40° C., 50% RH, by giving 66 g/cm2 of load, was used as a sample. 400 g of the sample was vibrated for 30 seconds with an amplitude of 1 mm by using an oscillating sieve apparatus which seta sieve of 45 micrometers of openings.

A ratio of aggregate, which remained in a sieve, estimated in the following basis.

The blocking resistance is as favorable as what has a small ratio of aggregate.
  Double circle; in the case of less than 10 mass %
  Single circle; in the case of less than 10-20 mass %
  Triangle; in the case of less than 20-30 mass %
  Cross; in the case of more than 30 mass %

Examples 2-18

The electro-photographic toner 2-27 was prepared in the similar manner to Example 1 except for the combination of branched crystalline polyester (A) and polyester resin for binders (B) to be the combination shown in the first table.

The evaluation is performed in the similar manner to Example 1, and the result is shown in the first table.

TABLE 1

The first Table

|  | Toner for electro-photography | Polyester resin (A) | Polyester resin (B) | Low-temperature-fixing-properties | Hot offset resistance | Blocking resistance |
|---|---|---|---|---|---|---|
| Example | 1  | 1  | (A1) | (B1) | ◎ | ○ | ◎ |
|         | 2  | 2  | (A1) | (B2) | ◎ | ◎ | ○ |
|         | 3  | 3  | (A1) | (B3) | ◎ | ◎ | ○ |
|         | 4  | 4  | (A2) | (B1) | ◎ | ○ | ◎ |
|         | 5  | 5  | (A2) | (B2) | ◎ | ◎ | ○ |
|         | 6  | 6  | (A2) | (B3) | ◎ | ◎ | ○ |
|         | 7  | 7  | (A3) | (B1) | ◎ | ○ | ◎ |
|         | 8  | 8  | (A3) | (B2) | ◎ | ◎ | ○ |
|         | 9  | 9  | (A3) | (B3) | ◎ | ◎ | ○ |
|         | 10 | 10 | (A4) | (B1) | ◎ | ○ | ◎ |
|         | 11 | 11 | (A4) | (B2) | ○ | ◎ | ○ |
|         | 12 | 12 | (A4) | (B3) | ○ | ◎ | ○ |
|         | 13 | 13 | (A5) | (B1) | ◎ | ○ | ◎ |
|         | 14 | 14 | (A5) | (B2) | ○ | ◎ | ○ |
|         | 15 | 15 | (A5) | (B3) | ○ | ◎ | ○ |
|         | 16 | 16 | (A6) | (B1) | ◎ | ○ | ◎ |
|         | 17 | 17 | (A6) | (B2) | ○ | ◎ | ○ |
|         | 18 | 18 | (A6) | (B3) | ○ | ◎ | ○ |

Comparative Examples 1-12

Combination of branched crystalline polyester (A') and polyester resin for binders (B) was in the combination shown in the first table. Except for that, the electro-photographic toner 1-13 for comparison and contrast were prepared in the similar manner to Example 1.

It evaluates in the similar manner to Example 1, and the result is shown in the second table.

Comparative Example 13

A distilling column, an apparatus for water separation, a nitrogen gas introducing pipe, a thermometer, and a stirring measure are installed to a 60 L reaction container in accordance with a conventional method. Under a nitrogen gas atmosphere, 100 mol of terephthalic acid as a dicarboxylic acid component, and 120 mol of 1,4-butanediol as a diol component, were added. 0.05 mol of titaniumtetrabutoxide (TBB) is added as an esterification condensation catalyst. Then, at 220° C., while generated water was distilled from a distilling column, the esterification reaction was performed.

The esterification reaction was finished when water was finished to be distilled from the distilling column.

After an end of the esterification reaction, an opening to the distilling column of the 60 L reaction container is closed, and the line from a vacuum pump is opened, and inside of the system of reaction is decompressed to 5 mmHg or less. While performing a condensation reaction at 240° C. with a number of stirring rotations being 60 rpm, and the isolated diol generated in the condensation reaction was distilled out of the system of reaction. Then, high-melting crystallinity polyester (B4) was obtained.

A melting point of the resin measured by DSC was 227° C.

In a 60 L reaction container, a distilling column, an apparatus for water separation, a nitrogen gas introducing pipe, a thermometer, and a stirring measure was installed in accordance with a conventional method. Under a nitrogen gas atmosphere, it is prepared that 90 mol of terephthalic acid as a dicarboxylic acid component, 5 mol of isophthalic acid and 5 mol of phthalic anhydride as a crookedness monomer component, 60 mol of neopentyl glycol as a branch monomer component, 60 mol of ethylene glycol as the other diol, and 0.05 mol of titaniumtetrabutoxide (TBB) as an esterification condensation catalyst. At 200° C., an esterification reaction was performed by distilling generated water from the distilling column. The esterification reaction was finished when water stopped to be distilled from the distilling column.

After the end of the esterification reaction, an opening to a distilling column of the 60 L reaction container of is closed, and the line from a vacuum pump is opened, and inside of the system of reaction is decompressed to 5 mm Hg or less, While performing a condensation reaction at 240° C. with a number of stirring rotations being 60 rpm, and isolated diol generated in the condensation reaction was distilled out of the system of reaction. Subsequently, amorphous polyester (B5) was obtained.

The glass transition point of the resin measured by DSC was 60° C.

In a 60 L reaction container, a distilling column, an apparatus for water separation, a nitrogen gas introducing pipe, a thermometer, and a stirring measure are installed in accordance with a conventional method. Under a nitrogen gas atmosphere, it is prepared that 90 mol of terephthalic acid as a dicarboxylic acid component, 10 mol of isophthalic acid as a crookedness monomer component, 60 mol of neopentyl glycol as a branched monomer component, 60 mol of ethylene glycol as other diol, 0.05 mol of titaniumtetrabutoxide (TBB) as an esterification condensation catalyst. At 200° C., an esterification reaction was performed by distilling generated water from the distilling column.

The esterification reaction was finished when stopping distilled water from the distilling column.

After the end of the esterification reaction, and opening to the distilling column of the 60 L reaction container is closed, and the line from a vacuum pump is opened, and inside of the system of reaction is decompressed to 5 mmHg or less, while performing a condensation reaction at 240° C. and a number of stirring rotations being 60 rpm, and isolation diol generated in the condensation reaction was distilled out of the system of reaction. Then, amorphous polyester (B6) was obtained.

A glass transition point of the resin measured by DSC was 78° C.

In a 60 L reaction container, a distilling column, an apparatus for water separation, a nitrogen gas introducing pipe, a thermometer, and a stirring measure are installed in accordance with a conventional method. Under a nitrogen gas atmosphere, 10 weight sections of maleic anhydride modified polypropylene (AC-597A: produced by Haneywell Inc.) of acid value 80 mg KOH/g and 90 weight sections of amorphous polyester were heated at 250° C. After melting, kneading and stirring was continued for 30 minutes, the esterification reaction was performed. Then, the compatibilizer (C1) was obtained.

10 weight sections of obtained crystalline polyester (B4), 80 weight section of amorphous polyester (B5), and 10 weight sections of amorphous polyester (B6) are melt-kneaded at the barrel temperature of 240° C. by using a twin screw extruder of L/D=37. Then, resin for toner was obtained.

To 94 weight sections of the obtained resin for toner, 6 weight sections of compatibilizers (C1), 1 weight section of charge controlling agents (TN-105: produced by Hodogaya Chemical Co., LTD.), 5 weight sections of magenta pigments coming under Carmine 6B, 5 weight sections of carnauba wax (melting point of 83° C.) are fully mixed with a Henschel mixer. After that, melt kneading was carried out at 130° C. Then, it was cooled, and coarse grinding was carried out.

Subsequently, it was pulverizes with a jet mill (lab jet: produced by Nippon Pneumatic Mfg. Co., Ltd), and a powder of toner with a mean particle diameter being about 8-12 micrometers was obtained.

Further, the powder of this toner is classified with a classifier (MDS-2: made by Nippon Pneumatic Mfg. Co., Ltd). Then, minute powder of the toner with a mean particle diameter being about 10 micrometers was obtained.

To 100 weight sections of this minute powder of the toner, 1.0 weight section of hydrophobic silica (R972: produced by NIPPON AEROSIL CO., LTD.) was mixed uniformly (externally adding), and toner 13' for comparison was manufactured.

It evaluates in the similar manner to Example 1 by using this toner, and the result is shown in the second table.

TABLE 2

The second Table

| | | Toner for electro-photography | | Polyester resin (A') | Polyester resin (B) | Low temperature fixing properties | Hot offset resistance | Blocking resistance |
|---|---|---|---|---|---|---|---|---|
| Comparative Example | 1 | 1' | | (A'1) | (B1) | ○ | x | Δ |
| | 2 | 2' | | (A'1) | (B2) | ○ | x | Δ |
| | 3 | 3' | | (A'1) | (B3) | ○ | x | Δ |
| | 4 | 4' | | (A'2) | (B1) | ○ | x | Δ |
| | 5 | 5' | | (A'2) | (B2) | ○ | x | Δ |
| | 6 | 6' | | (A'2) | (B3) | ○ | x | Δ |
| | 7 | 7' | | (A'3) | (B1) | ○ | x | Δ |
| | 8 | 8' | | (A'3) | (B2) | ○ | x | Δ |
| | 9 | 9' | | (A'3) | (B3) | ○ | x | Δ |
| | 10 | 10' | | (A'4) | (B1) | ○ | x | Δ |
| | 11 | 11' | | (A'4) | (B-2) | Δ | x | Δ |
| | 12 | 12' | | (A'4) | (B3) | Δ | x | Δ |
| | 13 | 13' | (B4)(B5)(B6)(C1) | | | x | x | Δ |

What is claimed is:

1. A resin composition for electro-photographic toner comprising:
   a polyester resin (A) and an aliphatic crystalline polyester resin (B), wherein the polyester resin (A) is formed from the reaction of a monocarboxylic acid having an alkyl group in which a number of carbon atoms is within the range of from 20 to 80 or having an alkenyl group in which a number of carbon atoms is within the range of from 20 to 80 in a molecular terminal, at a weight ratio of 25 to 95% by weight of the resin, with a polyester resin (A1) having a main skeleton of multi-branched state polyester structure expressed by structural formula (1):

(1)

wherein R represents an aliphatic hydrocarbon group, and n represents a number of the repeating units of a branch with a highest number of repeating units of the branched structure and is from 1 to 5, * a is a node of the carbon atom of a carbonyl group, *b is a node of an oxygen atom and is bonded to *a in another repeating unit.

2. A resin composition for electro-photographic toner according to claim 1, wherein the polyester resin (A) is a polyester resin having an alkyl group in which the number of carbon atoms is within the range from 22-74 or an alkenyl group in which the number of carbon atoms is within the range from 22-74 at a weight ratio of 25 to 95% by weight of the resin.

3. A resin composition for electro-photographic toner according to claim 1, wherein the polyester resin (A) is a polyester resin in which n in the structural formula (1) is from 2 to 4.5.

4. A resin composition for electro-photographic toner according to claim 1, wherein the polyester resin (A) is a polyester resin in which n in the structural formula (1) is from 1 to 3.

5. A resin composition for electro-photographic toner according to claim 1, wherein the polyester resin (A) is a polyester resin in which n in the structural formula (1) is 1 or 3.

6. The resin composition for electro-photographic toner according to claim 1, wherein
the polyester resin (A) is the polyester resin given by the reaction of a monocarboxylic acid having an alkyl group in which the number of carbon atoms is within the range of from 20 to 80 or having an alkenyl group in which the number of carbon atoms is within the range of from 20 to 80 with a polyester resin (A1) having a main skeleton of multi-branched state polyester structure expressed by a structural formula (1) as the repeating unit, and having a hydroxyl group of a hydroxyl value for 100-750 mg KOH/g, wherein the reaction is carried out so as to use the monocarboxylic acid at quantity thereof being 10-60 mol % to total molar quantity of a raw material for preparing the polyester resin (A1) and the monocarboxylic acid.

7. The resin composition for electro-photographic toner according to claim 6, wherein
the polyester resin (A1) is a polyester resin obtained by reacting a compound having two or more hydroxyl groups per molecule with a compound having one carboxyl group per molecule and two hydroxyl groups to give a reactant having a hydroxyl group at the end, then reacting the yielded hydroxyl group with a carboxyl group of the compound which has one carboxyl group per molecule and two hydroxyl groups.

8. The resin composition for electro-photographic toner according to claim 7, wherein
the compound having two or more hydroxyl groups per molecule is trimethylolpropane; and
the compound having one carboxyl group per molecule and two or more hydroxyl groups is dimethylol propionic acid.

9. The resin composition for electro-photographic toner according to claim 7, wherein
the compound having two or more hydroxyl groups per molecule is pentaerythritol; and
the compound having one carboxyl group per molecule and two or more hydroxyl groups is dimethylol propionic acid.

10. The resin composition for electro-photographic toner according to claim 1, wherein the polyester resin (A) is a polyester resin of the weight-average molecular weight 1,000-100,000.

11. The resin composition for electro-photographic toner according to claim 9, wherein the polyester resin (A) is polyester resin having a melting point at 45-165° C.

12. The resin composition for electro-photographic toner according to claim 1, wherein weight-average molecular weight of the polyester resin (B) is within the range of 6000-250000, and a glass transition point is within the range of 45-165° C.

13. The resin composition for an electro-photographic toner according to any one of claims 1 to 12, wherein the content of the polyester resin (A) is 0.1-50 mass parts to a total of 100 mass parts for polyester resin (A) and polyester resin (B).

14. An electro-photographic toner having the resin composition for electro-photographic toner according to any one of claims 1 to 12.

* * * * *